March 30, 1965 R. E. POLLARD 3,175,534
PET DRYING DEVICE

Filed Nov. 15, 1963 2 Sheets-Sheet 1

Robert E. Pollard
INVENTOR.

BY
Attorneys

March 30, 1965 R. E. POLLARD 3,175,534
PET DRYING DEVICE
Filed Nov. 15, 1963 2 Sheets-Sheet 2
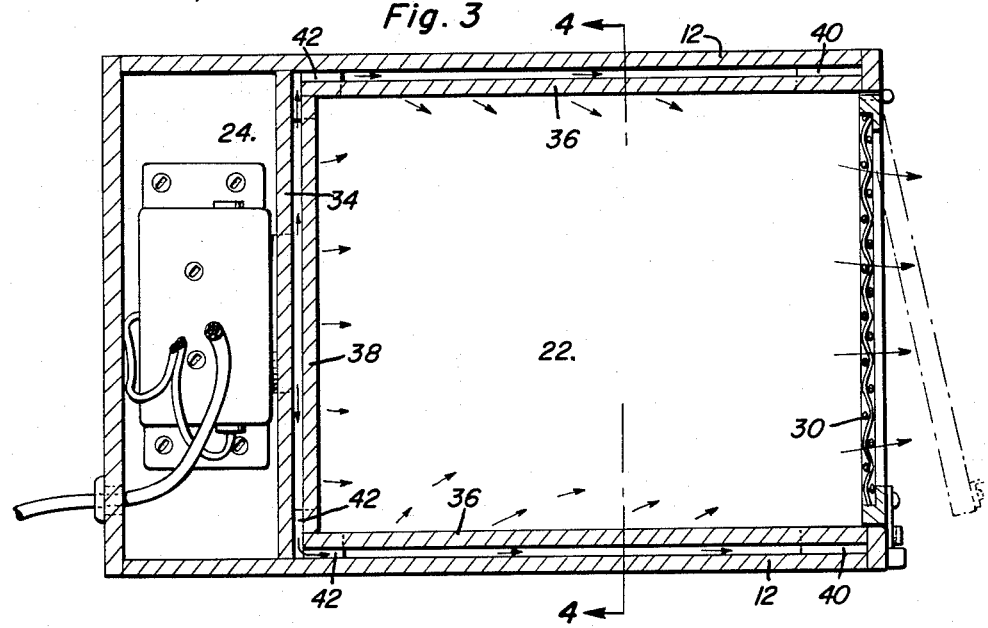
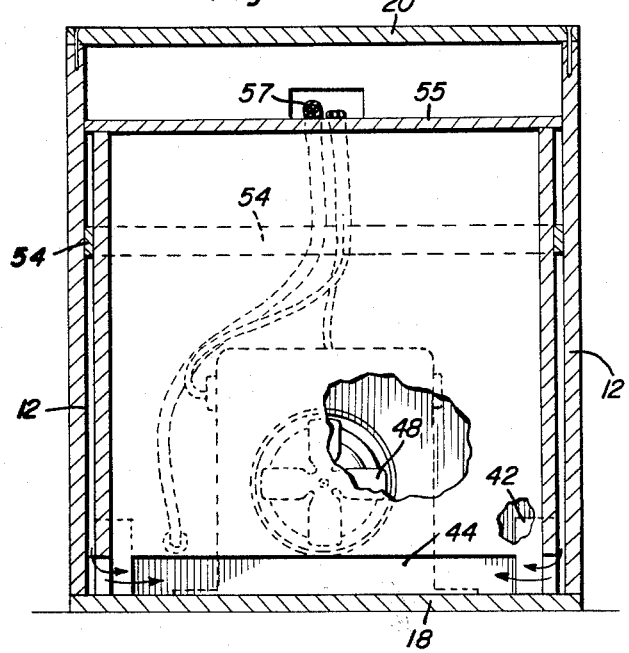
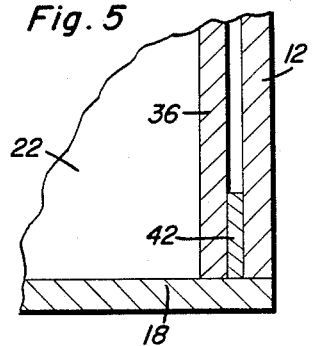
Robert E. Pollard
INVENTOR.

3,175,534
PET DRYING DEVICE
Robert E. Pollard, Apple Valley, Calif., assignor of fifty percent to Margaret E. Pollard, Apple Valley, Calif.
Filed Nov. 15, 1963, Ser. No. 324,060
5 Claims. (Cl. 119—1)

The instant invention relates to new and useful improvements in animal dryers, and is more specifically concerned with a drying enclosure for a pet wherein the animal will be both surrounded by heated walls and subjected to a gentle flow of heated air.

Accordingly, it is a primary object of the instant invention to provide a pet drying device for comfortably, safely and quickly drying a pet after the pet has been washed or bathed.

In conjunction with the above object, it is also an object of the instant invention to provide an enclosure for the pet while it is being dried so as to free the user of the device for other chores, such as bathing a second pet.

Likewise, it is an object of the instant invention to provide a device which, while relatively simple in construction, effectively performs in the manner intended.

Basically, in achieving the above objects, the instant invention consists of an enlarged enclosure divided into an equipment chamber and a drying chamber with the drying chamber including a screened or vented door at one end thereof along with heat-transmitting wall spaces about the remainder of the drying chamber, these heating spaces receiving forced heated air from suitable means within the equipment chamber and distributing this air into the drying chamber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a cross-sectional view taken substantially on a plane passing along line 3—3 in FIGURE 2;

FIGURE 4 is a transverse cross-sectional view taken substantially on a plane passing along line 4—4 in FIGURE 3 with a portion broken away for purposes of illustration; and FIGURE 5 is an enlarged partial cross-sectional view taken substantially on a plane passing along line 5—5 in FIGURE 2 illustrating a detail of the invention.

Figure 1:
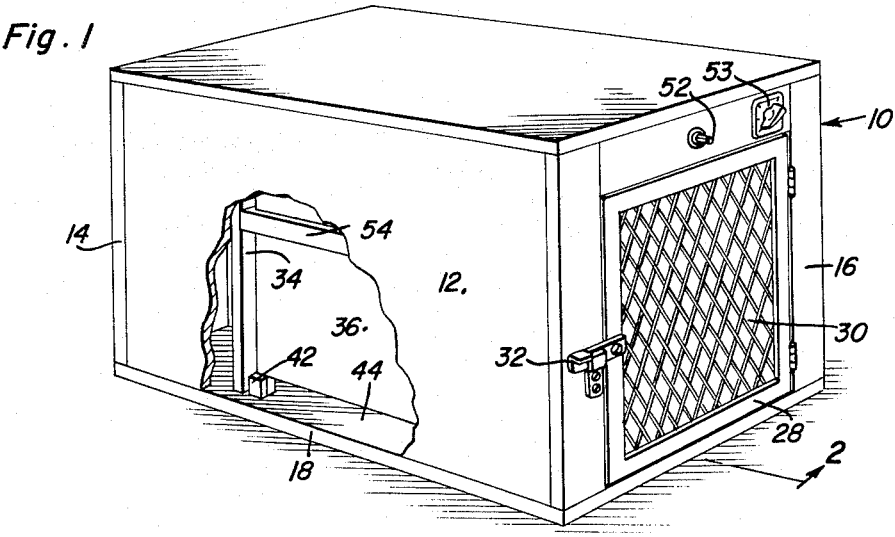
FIGURE 1 is a perspective view of the device comprising the instant invention with a portion broken away for purposes of illustration.
Figure 2:
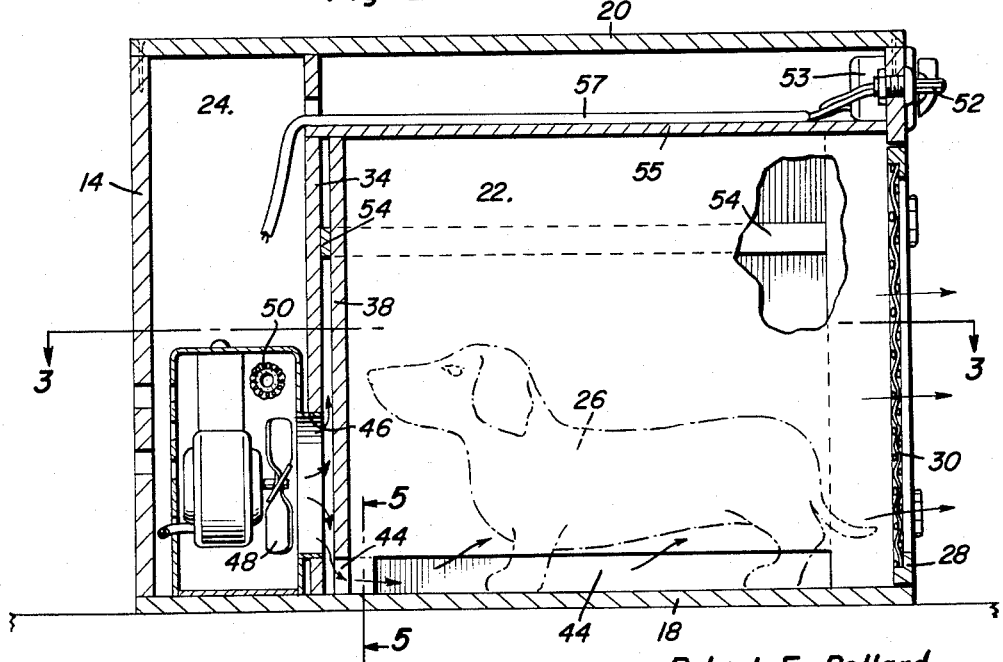
FIGURE 2 is an enlarged cross-sectional view taken substantially on a plane passing along line 2—2 in FIGURE 1.

Referring now more specifically to the drawings, reference numeral 10 is used to generally designate the enclosure of the drying device comprising the instant invention. This enclosure 10 is rectangular in shape and includes two side walls 12, a rear wall 14, a front wall 16, a bottom 18, and a top 20.

The interior of the enclosure 10 is divided into an enlarged forward drying chamber 22 and a relatively small rear equipment chamber 24. The drying chamber 22 is to receive the pet, generally indicated by reference numeral 26, and the size of this chamber can of course be varied in accordance with the general size of the pets to be dried. Entry into the drying chamber 22 is provided by means of a hingedly mounted portion of the front wall 16, forming in effect a door 28, this door 28 being suitably screened or vented, as at 30, for reasons which shall be gone into presently. A suitable lock or catch 32 is also of course provided for retaining the door 28 closed.

The two chambers 22 and 24 are formed by a vertically extending partition wall 34 which in effect forms the back wall of the drying chamber 22. Side and rear inner walls 36 and 38 are provided parallel to and spaced slightly inward of the side and back walls of the drying chamber 22 so as to form both heat-panels and hot air passages as shall be explained presently. These inner walls 36 and 38 are properly located by full height spacers 40 at the forward portions of the side walls 36 between the side walls 36 and the main enclosure walls 12, and by short spacers 42 spacing the lower rear corners of the side walls 36 from the walls 12 and the lower corners of the rear inner wall 38 from the partition wall 34.

Each of the inner walls 36 and 38 is provided with an elongated opening 44 along the lower edge thereof so as to communicate the space between the walls with the interior of the drying chamber 22.

The partition wall 34 is provided with an enlarged aperture 46 therethrough, this aperture being centrally located along the width thereof and communicating the equipment chamber 24 with the space between the partition wall 34 and inner wall 38 above the opening 44 in the inner wall 38.

Within the equipment chamber 24 is mounted any suitable motor-driven blower 48 and heater 50 combination provided in direct communication with the wall space through the aperture 46 for the introduction of forced heated air into this wall space. Control of the blower and heater combination is effected from the front of the enclosure where both a switch 52 and timer 53 are located, the timer 53 being variable and automatically shutting off the flow of heated air after a predetermined time lapse. A top liner 55 is provided in the drying chamber below the top 20 so as to provide a passage for the conductors 57 from the blower 48 and heater 50 to the switch 52 and timer 53. The partition 34 is apertured so as to allow for passage of the conductors 57 therethrough.

In operation, the pet is placed within the drying chamber 22 and the blower 48 and heater 50 turned on so as to force heated air between the spaced walls of the drying chamber, this heated air first striking the inner surface of the inner wall 38 and then being directed vertically and laterally for distribution throughout the wall space and subsequent movement through the openings 44 into the interior of the chamber 22 from which it is exhausted through the vented or screened door 28. In this manner, it will be appreciated that the animal is surrounded by heated panels and subjected to a gentle flow of heated air so as to provide a thorough and even drying of the pet while avoiding any direct or forceful blast of air contacting the pet such as might cause discomfort or harm to the animal.

Furthermore, in order to restrict or limit the flow of air within the wall spaces in accordance with the general size of the pets to be dried, horizontal blocking 54 is provided between the inner walls 36 and 38 and the walls 12 and 34 so as to limit the upward movement of the heated air, the height of this blocking 54 of course varying in accordance with the size of pets involved.

From the foregoing, it is considered to now be readily apparent that a highly novel and useful device has been defined for effecting the rapid, proper and safe drying of a pet in a simple and highly novel manner through the use of an enlarged drying chamber surrounded by spaced walls forming, in effect, heating panels as well as passages for the introduction of forced heated air into the bottom of the drying chamber for movement past the animal enclosed therein.

The foregoing is considered as illustrative only of the principles of the invention. Further, since numerous modifications and changes will readily occur to those

What is claimed as new is as follows:

1. A pet drying device including a drying chamber, said drying chamber including an outer peripheral wall, a minor portion of said outer wall being screened, an inner wall spaced inwardly from the outer wall of the drying chamber completely thereabout except for the screened portion, said inner wall including spaced openings adjacent a bottom portion thereof communicating the interior of the drying chamber with the space between the walls, and means for introducing forced heated air into the space between the walls at a point approximately opposite from said screened wall portion for heating the space between the walls and for subsequent discharge of the heated air into the drying chamber through the inner wall openings.

2. The structure of claim 1 including horizontal blocking means positioned at a predetermined height within the space between the walls so as to limit the upward movement of the air therein, said air being introduced below the blocking means.

3. The structure of claim 2 including a second walled chamber having a common wall portion with the drying chamber, this common wall portion being substantially opposite from the screened wall portion, said means for introducing heated air consisting of a heater and a blower mounted within said second chamber, and an aperture through said common wall portion communicating the second chamber with the space between the drying chamber wall and the inner wall above the inner wall openings, said heater and blower being orientated so as to force heated air through the aperture and into the space for subsequent distribution through the inner wall openings.

4. The structure of claim 3 wherein said screened wall portion of the drying chamber is in the form of a pivotally mounted door for enabling access to the drying chamber.

5. An animal drying device including a rectangular outer enclosure having side walls, a vertical partition dividing the enclosure into a relatively large drying chamber and a relatively small equipment chamber, said drying chamber having a vented door mounted in the wall opposite from the vertical partition, an inner wall being located in inwardly spaced relation to each of the drying chamber side walls and the partition, the space between each side wall and its inner wall being in communication with the space between the partition and its inner wall, each inner wall including an opening through the bottom thereof communicating with the interior of the drying chamber, an aperture through the partition communicating the equipment chamber with the space between the partition and its inner wall, and forced heated air producing means located within the equipment chamber and communicated with the aperture for the introduction of heated air therethrough.

References Cited by the Examiner
UNITED STATES PATENTS

| | | |
|---|---|---|
| 1,236,102 | 8/17 | Orr. |
| 1,519,115 | 12/24 | Carol _____ 119—33 |
| 3,023,734 | 3/62 | Schaub _____ 119—99 |

SAMUEL KOREN, *Primary Examiner.*

HUGH R. CHAMBLEE, *Examiner.*